Patented May 5, 1936

2,039,577

UNITED STATES PATENT OFFICE 2,039,577

COMPOUNDS OF THE ACRIDINIUM SERIES AND A PROCESS OF PREPARING THEM

Louis Benda, Frankfort-on-the-Main, and Otto Sievers, Frankfort-on-the-Main-Hochst, Germany, assignors to Winthrop Chemical Company, Inc., New York, N. Y., a corporation of New York No Drawing. Application May 13, 1933, Serial No. 671,004. In Germany May 23, 1932

13 Claims. (Cl. 260—14)

The present invention relates to new compounds of the acridinium series and to a process of preparing them.

We have found that new compounds are obtained by double decomposition in aqueous solution between a water-soluble acridinium compound of the following general formula:

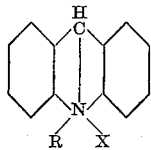

wherein R stands for a lower alkyl, lower hydroxyalkyl or a benzyl group, X stands for an anion of a mineral acid or a lower carboxylic acid, for instance of hydrochloric acid, hydrobromic acid, nitric acid, acetic acid, lactic acid or glycollic acid and in which the hydrogen atoms may be substituted, and a soluble salt of an isocyclic or heterocyclic arylarsonic acid. The new compounds probably correspond to the following general formula:

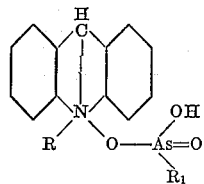

which may be substituted in the acridine nucleus by amino, alkyl, or alkoxy groups and wherein R stands for a lower alkyl, lower hydroxyalkyl or a benzyl group and R₁ stands for an aromatic or aromatic-heterocyclic radical. They have as compared with the starting materials the advantage that their bactericidal action is strongly enhanced, while their toxicity is not increased. They are crystalline compounds of a light-yellow to vermillion color and are sparingly soluble in water and in most of the organic solvents. All of them form readily soluble alkali salts; the substances made from aminoacridinium compounds also form soluble hydrochlorides.

Particularly valuable compounds are obtained by using as arsenic component acylated aminoaryl-arsonic acids in the form of their salts and as acridinium component 3.6-diamino-10-alkylacridinium compounds.

As groups which may be present as substituents at the acridine nitrogen atom 9 we mention methyl, ethyl, propyl, benzyl and hydroxyethyl.

Water-soluble salts of arsonic acids used for the reaction are, for instance, the alkali metal salts, such as the sodium and potassium salt.

The following examples illustrate the invention, the parts being by weight:

1. A solution of 25 grams of sodium para-glycollyl-aminophenylarsonate in 500 cc. of water is mixed with a solution of 25 grams of 3,6-diamino-10-methylacridinium chloride in 500 cc. of water having a temperature of 25° C. The mixture is allowed to stand for some time whereupon a vermillion crystal powder precipitates which is soluble in water in the proportion of 1:400. It is readily soluble in methanol, difficultly soluble in ethanol, almost insoluble in acetone and insoluble in ether, benzene and chloroform. The product has the following formula:

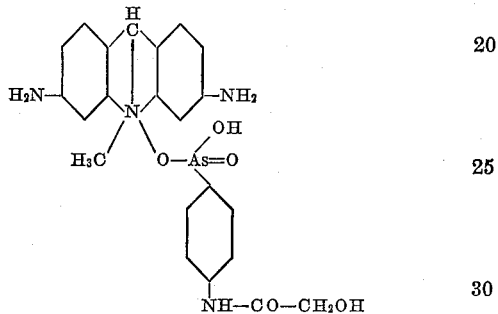

2. 13 grams of 3,6-diamino-10-methylacridinium chloride are dissolved in 200 cc. of water. A solution of 20 grams of sodium 3-acetylamino-4-hydroxy-5-chlorophenyl - 1 - arsonate in 100 cc. of water is added. The whole is allowed to stand for a prolonged time, until the reaction is complete. Orange needles are obtained which dissolve in water in the proportion of 1:400. The product has the following formula:

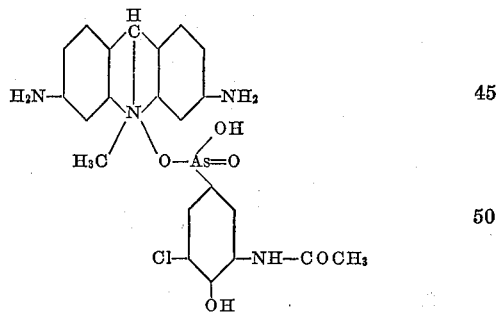

3. 23 grams of 2,4-dihydroxyphenyl-1-arsonic acid are dissolved in 200 cc. of ½N-caustic soda solution. The solution so obtained is added to a solution of 26 grams of 3.6-diamino-10-methyl-acridinium chloride in 250 cc. of water. The reaction immediately occurs with separation of yellow-orange crystals which dissolve in water in the proportion of 1:1000. The product has the following formula:

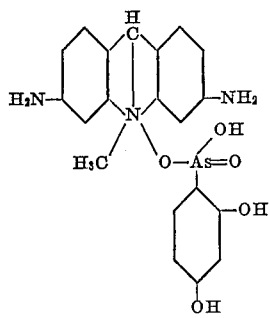

4. 29 grams 3,6-dimethoxy-10-methylacridinium chloride are dissolved in 350 cc. of hot water. A solution of 32 grams of sodium 4-phenylglycine-amide-1-arsonate in 100 cc. of water is added, while stirring. On cooling, orange crystals precipitate which dissolve in water in the proportion of 1:300. The product has the following formula:

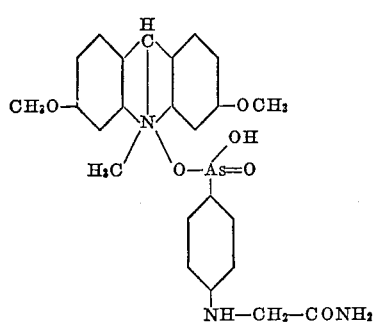

5. 28 grams of 3,6-diamino-10-methylacridinium acetate and 28 grams of sodium benzoxazolone-6-arsonate are dissolved, each in 200 cc. of water. The two solutions are mixed. Light-orange crystals precipitate which dissolve in water in the proportion 1:1000. The product has the following formula:

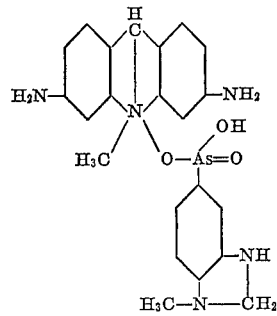

6. 26 grams of 3,6-diamino-10-methylacridinium chloride are dissolved in 250 cc. of water and 30 grams of sodium 3-methylbenzimidazole-6-arsonate are dissolved in 100 cc. of water. The two solutions are mixed and the mixture is allowed to stand in ice. Yellow-orange crystals precipitate which dissolve in water in the proportion of 1:100. The product has the following formula:

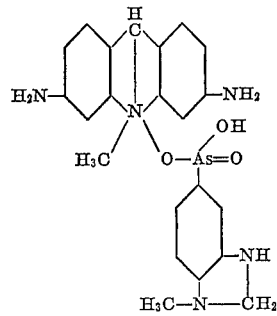

7. A solution of 20 grams of 2,7-dimethyl-3,6-diamino-10-methylacridinium chloride in 500 cc. of water is mixed with a solution of 30 grams of sodium 4-glycollylaminophenyl-1-arsonate in 100 cc. of water. Yellow crystals precipitate which dissolve in water in the proportion of 1:500. The product has the following formula:

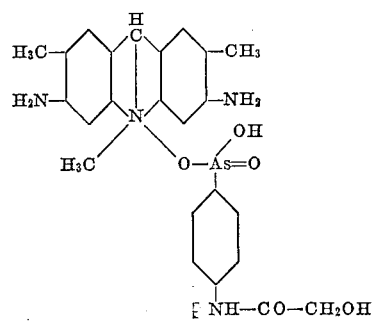

8. 10 grams of 4-acetylamino-2-phenoxyacetic acid-1-arsonic acid are dissolved in 75 cc. of N-caustic soda solution. The solution which has a feebly alkaline reaction is made exactly neutral by cautiously adding N-hydrochloric acid. A solution of 8 grams of 3,6-diamino-10-methylacridinium chloride in 100 cc. of water is added. By adding 150 cc. of acetone, while cooling with ice, the sodium salt of the compound is precipitated in the form of slightly reddish-yellow needles which dissolve in water in the proportion of 1:20. By adding the exactly calculated quantity of hydrochloric acid to a 1 per cent. solution, there is obtained a clear solution of the compound of 1 molecular proportion of 3,6-diamino-10-methyl-acridinium chloride with the sodium salt of 4-acetylamino-2-phenoxyacetic acid -1- arsonic acid. The product has the following formula:

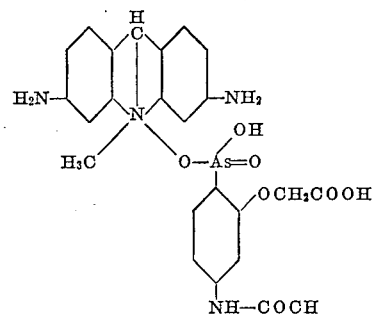

We claim:
1. The process which comprises causing a water-soluble salt of an arylarsonic acid in an aqueous solution to act upon a water-soluble acridinium compound of the following general formula:

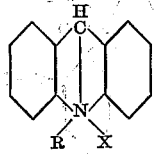

which may be substituted by amino, alkyl or alkoxy groups and wherein R stands for a lower alkyl or a lower hydroxyalkyl group and X stands for a mineral acid anion or a lower carboxylic acid anion.

2. The process which comprises causing a water-soluble salt of an arylarsonic acid in an aqueous solution to act upon a water-soluble diamino acridinium compound of the following general formula:

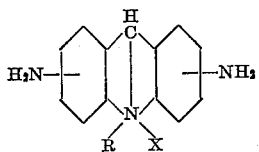

which may be substituted by alkyl or alkoxy groups and wherein R stands for a lower alkyl or a lower hydroxyalkyl group and X stands for a mineral acid anion or a lower carboxylic acid anion.

3. The process which comprises causing a water-soluble salt of an acylaminoarylarsonic acid in an aqueous solution to act upon a water-soluble diamino acridinium compound of the following general formula:

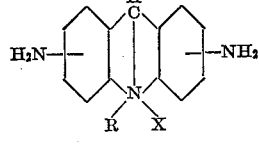

which may be substituted by alkyl or alkoxy groups and wherein R stands for a lower alkyl or a lower hydroxyalkyl group and X stands for a mineral acid anion or a lower carboxylic acid anion.

4. The process which comprises causing an alkali metal salt of an acylaminoarylarsonic acid in an aqueous solution to act upon 3.6-diamino-10-methylacridinium chloride.

5. The process which comprises causing the sodium salt of para-glycolylaminophenylarsonic acid in an aqueous solution to act upon 3.6-diamino-10-methylacridinium chloride.

6. The process which comprises causing the sodium salt of 3-acetylamino-4-hydroxy-5-chlorophenyl-1-arsonic acid in an aqueous solution to act upon 3.6-diamino-10-methylacridinium chloride.

7. The process which comprises causing the sodium salt of 4-acetylamino-2-phenoxyacetic acid-1-arsonic acid in an aqueous solution to act upon 3.6-diamino-10-methylacridinium chloride.

8. The compounds of the following general formula:

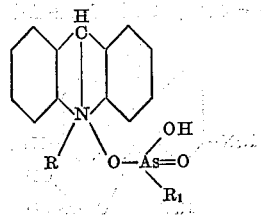

which may be substituted in the acridine nucleus by amino, alkyl or alkoxy groups and wherein R stands for a lower alkyl or a lower hydroxyalkyl group and $R_1$ stands for an aromatic or benzo-heterocyclic radical, said compounds being slightly yellow to vermilion, difficultly soluble in water and most of the organic solvents.

9. The compounds of the following general formula:

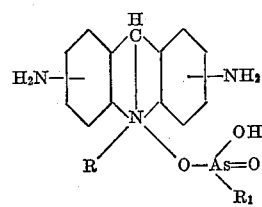

which may be substituted in the acridine nucleus by alkyl, or alkoxy groups and wherein R stands for a lower alkyl or a lower hydroxyalkyl group and $R_1$ stands for an aromatic or benzo-heterocyclic radical, said compounds being slightly yellow to vermilion, difficultly soluble in water and most of the organic solvents.

10. The compounds of the following general formula:

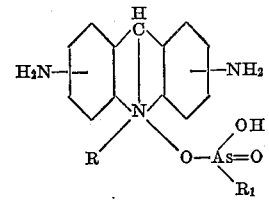

which may be substituted in the acridine nucleus by alkyl or alkoxy groups and wherein R stands for a lower alkyl or a lower hydroxyalkyl group and $R_1$ stands for an aromatic or benzo-heterocyclic radical containing an acylamino group, said compounds being slightly yellow to vermilion, difficulty soluble in water and most of the organic solvents.

11. The compound of the following formula:

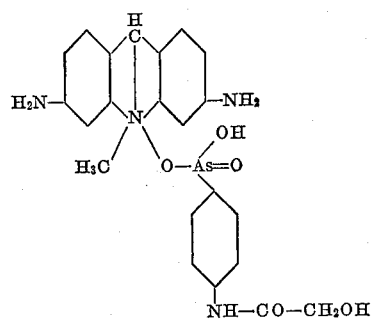

said compound being cinnabar-red, easily soluble in methanol, difficultly soluble in alcohol, water, insoluble in ether, benzene and chloroform.

12. The compound of the following formula:

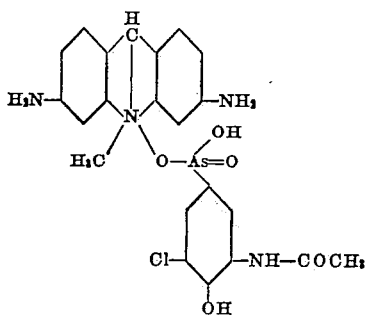

said compound being orange, difficultly soluble in water and most of the organic solvents.

13. The compound of the following formula:

said compound being reddish-yellow, soluble in alkali, difficultly soluble in water and most of the organic solvents.

LOUIS BENDA.
OTTO SIEVERS.